UNITED STATES PATENT OFFICE.

HENRY STAFFORD HATFIELD, OF BRIGHTON, ENGLAND.

CATHODE.

No. 860,657.

Specification of Letters Patent.

Patented July 23, 1907.

Application filed August 20, 1906. Serial No. 331,398.

*To all whom it may concern:*

Be it known that I, HENRY STAFFORD HATFIELD, a subject of the King of Great Britain and Ireland, residing at Lewis Road, Brighton, in the county of Sussex, England, have invented new and useful Improvements in Cathodes, of which the following is a specification.

My invention relates to improvements in cathodes for electrolytic purposes specially applicable for use with electrolytes containing mercuric salts in solution. It is usual to employ cathodes of platinum or of carbon for electrolytic purposes but these materials are not suitable in the case of electrolytes containing mercuric salts in solution. The reason is that in a mercuric solution platinum quickly becomes amalgamated and is therefore useless for delicate purposes such as metering while carbon on the other hand quickly disintegrates I have discovered that efficient cathodes for use in mercuric solutions may be made from a certain group of substances which for the purposes of this specification I term the "iridium" group of substances. The members of this group are iridium, tantalum, niobium, vanadium, silicon (of the form which I may term massive graphitoidal silicon) and magnetite (either artificial or natural). The substances in this group are distinguished from other substances in the following respects, (a) they are conductors of electricity; (b) they possess a physical hardness equal to or exceeding that of iridium; (c) they possess a chemical inertness equal to or exceeding that of iridium; (d) they no not amalgamate with mercury in a solution of a mercury salt in the mercuric state.

When iridium is the member of the group chosen I prefer to employ it in its rolled form or deposited upon glass and either coated or not with iridium black. When, tantalum, niobium and vanadium are chosen I prefer to employ them in the form of foil or of wire. When silicon is the substance chosen for my cathode I prefer to employ it in the form of what I may term a platinum sandwich that is to say cut into thin slices and with two of these slices placed together with a sheet of platinum foil placed between them. Any part of the platinum which may come into contact with the electrolyte is covered by a protective coating of glass or other suitable material. When magnetite is the member of the group chosen I melt it in the electric arc or oxyhydrogen flame over platinum wire and envelop the latter, where exposed, in glass. Of the substances specified I prefer iridium in the form of rolled sheet and I find that I obtain a great advantage by hardening it by sand blasting before use.

What I claim as my invention and desire to secure by Letters Patent is:—

1. The combination of an electrolyte containing mercuric salts in solution, and a cathode of the described iridium group, substantially as described.

2. The combination of an electrolyte containing mercuric salts in solution, and a cathode characterized by being a conductor of electricity, by possessing a physical hardness and a chemical inertness at least equal to that of iridium, and by not amalgamating with mercury in a solution of a mercury salt in the mercuric state, substantially as described.

In witness whereof I have signed my name to this specification in the presence of two subscribing witnesses.

HENRY STAFFORD HATFIELD.

Witnesses:
 JAMES G. LORRAIN,
 WILLIAM B. PRINCE.